United States Patent Office 3,113,144
Patented Dec. 3, 1963

3,113,144
ORGANO-TIN OXIDES
Maurice L. Zweigle, Midland, Mich., assignor to The Dow Chemical Company, Midland, Mich., a corporation of Delaware
No Drawing. Filed Aug. 8, 1960, Ser. No. 47,934
12 Claims. (Cl. 260—429.7)

The present invention is concerned with novel organo-tin oxides and is particularly directed to compounds corresponding to the formula

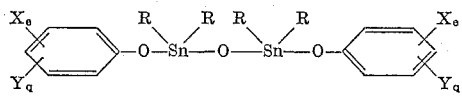

wherein each R represents phenyl or an alkyl containing from 1 to 4, inclusive, carbon atoms, Y represents an alkyl, which may be a cyclic alkyl, containing from 1 to 6, inclusive, carbon atoms; X represents chlorine, bromine, or nitro, the subscript letter $e$ represents an integer from 1 to 3, inclusive; and subscript $q$ represents an integer of from 0 to 1, inclusive; not more than two of all of the positions ortho- and para- to the phenoxy linkage of any substituted phenyl group being occupied by substituents X and Y.

The present compounds are liquids or solids of very limited solubility in water, moderately soluble in many common organic solvents. They are useful in numerous agricultural applications. Specifically, the compounds are useful as fungicides for the control of fungus plant diseases, as insecticides, and in certain applications they are selective herbicides. The compounds are also nematocidal, and, when suitably exhibited may be used as rodenticides.

These compounds are prepared by a reaction between an organo-tin oxide compound and a phenol compound according to the following general scheme:

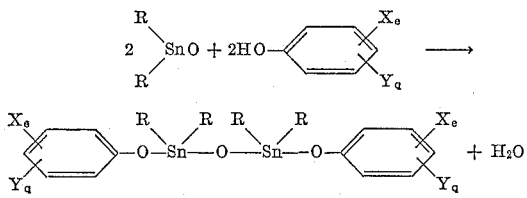

wherein R, X, Y, $q$, and $e$, have the values hereinbefore set forth.

It is essential and critical in the present invention that in the compound represented by the formula

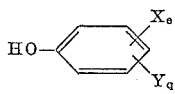

not more than two of all of the positions ortho and para to the hydroxyl group be occupied by substituents X and Y. No theory known to the inventor adequately explains why this limitation must be observed, but numerous preparations with 2,4-substituted phenols and 2,6-substituted phenols have been successful, as well as with numerous other substituted phenols not substituted in all of the 2,4, and 6 positions; whereas numerous preparations with 2,4,6-substituted phenols have failed to obtain the product of the present invention.

The reaction is conveniently carried out in a liquid reaction medium, and takes place with preparation of by-product water. Such byproduct is apparently harmless in the resulting reaction mixture and may, if desired, be permitted to remain in, or escape spontaneously from the reaction mixture. The reaction is moderately endothermic and takes place smoothly at temperatures in the range of 30–150° C. Within the stated range, temperatures may vary or, if desired, may conveniently be regulated by employing an inert liquid reaction medium which boils at a desired reaction temperature wherein the reaction may be carried out by heating a reaction mixture to reflux. Good results are obtained when employing amounts of the organotin oxide and phenol compound which are substantially chemical equivalents. Two phenolic hydroxy groups react with two organotin oxide groups with the resulting preparation of one molecule each of the desired product and of by-product water.

In carrying out the reaction, the organo-tin compound and phenol may be combined slowly, portionwise, in solvent and with stirring; or alternatively, they may be combined as single portions with or without solvent, the addition of solvent being carried out, if desired, only immediately before the beginning of heating. The reaction may be carried out in inert liquid medium such as methylenedichloride, toluene, carbontetrachloride, mixed technical dichlorobenzenes and the like. The reaction mixture comprising organotin oxide, phenol compound and reaction medium is thereafter heated in the reaction temperature range for a period of time to carry the reaction to completion.

Upon completion of the reaction, the desired products may be separated in various ways, conveniently by evaporation and removal of the reaction medium. The resulting products may, if desired, be purified in known procedures such as by fractional crystallization from solvent and the like.

The following examples illustrate the invention but are not to be considered as limiting.

EXAMPLE I

*Bis((p-Bromophenoxy)-Dibutyltin) Oxide*

A mixture of 34.6 grams 4-bromophenol and 50 grams di-n-butyltin oxide was dispersed in 300 milliliters methylene chloride and the resulting mixture was gently heated over an electric mantle and under reflux at a temperature of 40°–42° C. for five hours. Thereafter, the reflux apparatus was disconnected and the resulting reaction mixture was gently warmed to vaporize and remove reaction solvent leaving a solid white bis((p-bromophenoxy)di-n-butyltin) oxide product having a melting point of 144°–145° C. The resulting product was analyzed and found to contain 28.84 percent tin and 19.32 percent bromine as compared with theoretical values of 28.8 and 19.4 percent, respectively, all by weight.

In similar manner, by the employment of diethyltin oxide and 4-bromophenol, there is obtained a white crystalline solid bis((p - bromophenoxy) - diethyltin)oxide product.

EXAMPLE II

*Bis((5-bromo-2-Chlorophenoxy)Dibutyltin) Oxide*

A mixture of 50 grams (0.20 mole) dibutyltin oxide and 41.6 grams (0.20 mole) of 2-chloro-5-bromophenol was dispersed with stirring in 250 milliliters methylene chloride. The resulting dispersion was thereafter heated at a temperature of 40°–42° C. and under reflux for approximately 5 hours to carry the reaction to completion. At the end of this time, the liquid reaction medium was removed by vaporization to obtain a white solid bis((5-bromo-2-chlorophenoxy)dibutyltin)oxide product melting in the range of 86–90° C. and having upon analysis, 24.32 percent tin as compared with a theoretical value of 26.8 percent by weight.

EXAMPLE III

*Bis(Dibutyl(2,4-Dichlorophenoxy)Tin)Oxide*

In procedures similar to those of Example 2, except that the starting phenol was 2,4-dichlorophenol, a bis(dibutyl(2,4-dichlorophenoxy)tin)oxide product was prepared. The product was found to melt in the range of 104–108° C. and to have upon analysis, a content of 26.4 percent tin as compared with the theoretical value of 29.5 percent, both by weight.

EXAMPLE IV

The present example was carried out in manner similar to the foregoing except that the starting phenol was 2,4-dibromophenol, and was employed in equivalent amount, 50.4 grams. The reaction was carried out in toluene as reaction medium and under reflux at a temperature of approximately 110° C. for five hours. The operation, upon removal of liquid reaction medium, yielded a solid bis(dibutyl(2,4-dibromophenoxy)tin)oxide product having a melting temperature of 127–128° C. and found, upon analysis, to contain 25.64 percent tin as compared with a theoretical value of 24.2 percent, both by weight.

In similar procedures, by the employment of dimethyltin oxide and 2,4-dibromophenol, there is obtained a white bis(dimethyl(2,4-dibromophenoxy)tin)oxide product.

EXAMPLE V

In procedures similar to those in Example III, a mixture of dibutyltin oxide and 2,4,5-trichlorophenol was heated together under reflux and in boiling methylene chloride for five hours to obtain a bis(dibutyl(2,4,5-trichlorophenoxy)tin) oxide product melting at 118–119° C.

EXAMPLE VI

*Bis((p-Bromophenoxy)Diphenyltin) Oxide*

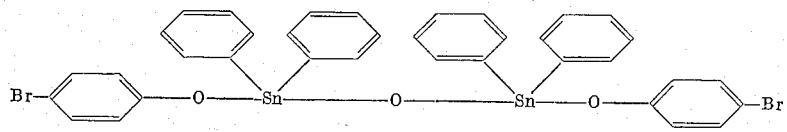

In procedures similar to the foregoing employing 72.3 grams diphenyltin oxide and 86.6 grams 4-bromophenol, there was obtained 156.3 grams bis((p-bromophenoxy)-diphenyltin) oxide melting in the range of 245–255° C.

In procedures similar to the foregoing, various other products were prepared. Specifically, by the reaction of diphenyltin oxide and 2-chloro-5-bromophenol, there was obtained a bis((5-bromo-2-chlorophenoxy)diphenyltin) oxide product melting in the range of 210°–225° C. and found, upon analysis, to contain 26.2 percent tin and 8.68 percent chlorine as compared with theoretical values of 24.6 and 7.35 percent, respectively, all by weight.

Also, employing dibutyltin oxide and 2,6-dichlorophenol, there was obtained a bis((2,6-dichlorophenoxy)-dibutyltin) oxide product melting at 109°–111° C. and found, upon analysis, to have contents of 29.15 percent tin and 17.13 percent chlorine as compared with 29.55 and 17.61 percent, theoretical, respectively, all by weight.

Also, by reaction of dibutyltin oxide and 2,5-dinitro-4-cyclohexylphenol there was obtained a bis(dibutyl(4-cyclohexyl 2,5-dinitrophenoxy)tin)oxide product melting in the range of 178–180° C. and found, upon analysis, to contain 23.35 percent tin and 4.95 percent nitrogen, as compared with 23.5 percent and 5.54 percent theoretical, all by weight. Similarly, by the reaction of dibutyltin oxide and 4-chloro-2-cyclohexylphenol, there was obtained a bis(dibutyl(4-chloro-2-cyclohexylphenoxy)tin)-oxide product melting at 118–122° C., and containing 26.06 percent tin and 7.65 percent chlorine as compared with theoretical values of 26.45 and 7.89 percent, all by weight, respectively.

The organotin oxide compounds of the present invention are useful as insecticides, fungicides, nematocides, herbicides for the highly selective control of certain weeds, and, suitably exhibited, as rodenticides. For such uses, the compounds may be employed directly. Alternatively, the compounds may be dispersed in an inert finely divided solid and the resulting preparation employed as a dust. Also, such preparations may be dispersed in water with or without the aid of wetting agents the resulting aqueous suspensions employed as sprays. In other procedures, the compounds may be employed in solvents or as constituents of solvent-in-water or water-in-solvent emulsions or as aqueous dispersions which may be applied by spray, drench, or wash. In a representative operation, the application to the leaves of young tomato plants of an aqueous spray composition containing ¼ pound of bis((p-bromophenoxy)-dibutyltin)oxide per hundred gallons of composition gave virtually complete protection to the tomato plants against the subsequent inoculation of the plants with spores of *Alternaria solani*, the causal organism of early blight. In contrast, untreated check plants similarly inoculated became heavily infected with tomato early blight.

I claim:

1. Compound corresponding to the formula

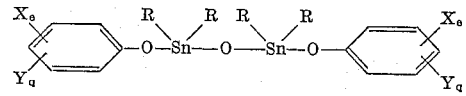

wherein each R represents a member of the group consisting of phenyl, and alkyl containing from 1 to 4, inclusive, carbon atoms; Y represents member of the group consisting of alkyl and cycloalkyl and containing from 1 to 6, inclusive, carbon atoms; X represents a member of the group consisting of chlorine, bromine, and nitro; subscript $e$ represents an integer of from 1 to 3, inclusive; and subscript $q$ represents an integer of from 0 to 1, inclusive, not more than two of all of the positions ortho and para to the phenoxy linkage of any substituted phenyl group being occupied by substituents X and Y.

2. Bis((p-bromophenoxy)-dibutyltin) oxide.
3. Bis((5-bromo-2-chlorophenoxy)dibutyltin) oxide.
4. Bis(dibutyl(2,4-dichlorophenoxy)tin) oxide.
5. Bis(dibutyl(2,4-dibromophenoxy)tin) oxide.
6. Bis(Dibutyl(2,4,5-trichlorophenoxy)tin) oxide.
7. Bis((p-bromophenoxy)diphenyltin) oxide.
8. Bis((5-bromo-2-chlorophenoxy)diphenyltin) oxide.
9. Bis((2,6-dichlorophenoxy)dibutyltin) oxide.
10. Bis(dibutyl(4-cyclohexyl-2,5 - dinitrophenoxy)tin) oxide.
11. Bis(dibutyl(4 - chloro - 2 - cyclohexylphenoxy)tin) oxide.
12. Method of preparing a compound corresponding to the formula

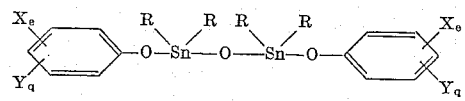

of which the essential step consists of reacting a tin oxide compound corresponding to the formula

with a phenol corresponding to the formula

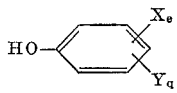

wherein each R represents a member of the group consisting of phenyl and alkyl containing from 1 to 4, inclusive, carbon atoms; Y represents a member of the group consisting of alkyl and cycloalkyl containing from 1 to 6, inclusive, carbon atoms; X represents a member of the group consisting of chlorine, bromine, and nitro; subscript $e$ represents an integer of from 1 to 3, inclusive and subscript $q$ represents an integer of from 0 to 1, inclusive: not more than two of all of the positions ortho and para to the hydroxyl group being occupied by substituents X and Y.

References Cited in the file of this patent
UNITED STATES PATENTS

| | | |
|---|---|---|
| 2,583,084 | Burt | Jan. 22, 1952 |
| 2,626,954 | Albert | Jan. 27, 1953 |
| 2,867,641 | Ramsden | Jan. 6, 1959 |

OTHER REFERENCES

Harada: "Sci. Papers Inst. Phy. and Chem. Research" (Tokyo), 35 (1939), page 304.